United States Patent
Xu et al.

(10) Patent No.: US 9,238,252 B2
(45) Date of Patent: Jan. 19, 2016

(54) VIBRATION SOUNDER

(71) Applicants: Wanghua Xu, Shenzhen (CN); Xudong Yan, Shenzhen (CN); Hongfu Xu, Shenzhen (CN)

(72) Inventors: Wanghua Xu, Shenzhen (CN); Xudong Yan, Shenzhen (CN); Hongfu Xu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/338,519

(22) Filed: Jul. 23, 2014

(65) Prior Publication Data

US 2015/0030198 A1  Jan. 29, 2015

(30) Foreign Application Priority Data

Jul. 23, 2013  (CN) ...................... 2013 2 0439156 U

(51) Int. Cl.
*H04R 1/00* (2006.01)
*B06B 1/04* (2006.01)
*H04R 9/02* (2006.01)
*H02K 1/00* (2006.01)

(52) U.S. Cl.
CPC ... *B06B 1/04* (2013.01); *H02K 1/00* (2013.01); *H04R 9/025* (2013.01); *H04R 2400/03* (2013.01)

(58) Field of Classification Search
USPC ......... 381/386, 396, 412, 315, 409, 410, 423, 381/424, 431, 395, 388, 333
See application file for complete search history.

(56) References Cited

U.S. PATENT DOCUMENTS 7,362,877 B2 * 4/2008 Honda ................... H04M 1/03
381/409
8,009,855 B2 * 8/2011 Chiba ............... H01R 13/2442
381/396

* cited by examiner

Primary Examiner — Sunita Joshi
(74) Attorney, Agent, or Firm — IPro, Inc.; Na Xu

(57) ABSTRACT

A vibration sounder includes an enclosure having a receiving space, a stator received in the receiving space and a conductive terminal. The stator includes a magnetic yoke formed with a through hole. The mover locates above the stator. The conductive terminal includes an insulative portion received in the through hole and a conductive portion connecting with the insulative portion. The vibration sounder of the present disclosure has a small volume and a simple structure.

9 Claims, 4 Drawing Sheets

VIBRATION SOUNDER

FIELD OF THE INVENTION

The present disclosure relates to a sounder, and more particularly, to a vibration sounder.

BACKGROUND OF THE INVENTION

In the modern era that is experiencing rapid development of portable devices such as mobile phone, people's requirements on functions of the mobile terminals become increasingly higher. Correspondingly, development of sounders becomes ever faster. Vibration sounders can drive a resonant medium to make a sound through vibration and, meanwhile, have a small volume and a desirable low-frequency sound effect, so they have gradually found wide application.

A conventional vibration sounder comprises a stator, a mover, an enclosure for receiving the stator and the mover, and a conductive terminal fixed on the enclosure.

However, as the conductive terminal is fixed on the enclosure, the form of the enclosure becomes relatively complex and the space occupied is relatively large, which makes it difficult to reduce the volume of the vibration sounder.

SUMMARY OF THE INVENTION

The major object of the present disclosure is to provide a vibration sounder that has a simple structure and a small volume so as to solve the aforesaid problem.

A vibration sounder comprises an enclosure having a receiving space, a stator received in the receiving space and a conductive terminal. The stator comprises a magnetic yoke formed with a through hole. The mover is located above the stator. The conductive terminal comprises an insulative portion received in the through hole and a conductive portion connecting with the insulative portion.

A vibration sounder comprises an enclosure having a receiving space, a stator received in the receiving space, a mover located above the stator and two conductive terminals. The stator comprises a magnetic yoke. The magnetic yoke is formed with through holes and notches. The notches are disposed diagonally at corners of the magnetic yoke, and the through holes are formed near the notches. Each of the conductive terminals comprises an insulative portion and a conductive portion connecting with each other. The insulative portions are received in the through holes. The conductive portions are disposed diagonally at the notches.

The benefits of the present disclosure are that: the conductive terminals are fixed on the magnetic yoke, which eliminates the need of providing a space for receiving the conductive terminals on the enclosure, so that the structure of the enclosure is simplified and the volume of the vibration sounder is reduced.

DETAILED DESCRIPTION OF AN EXEMPLARY EMBODIMENT

The present disclosure will be further described below with reference to the attached drawings and embodiments thereof by taking a vibration sounder as an example.

Figure 1:
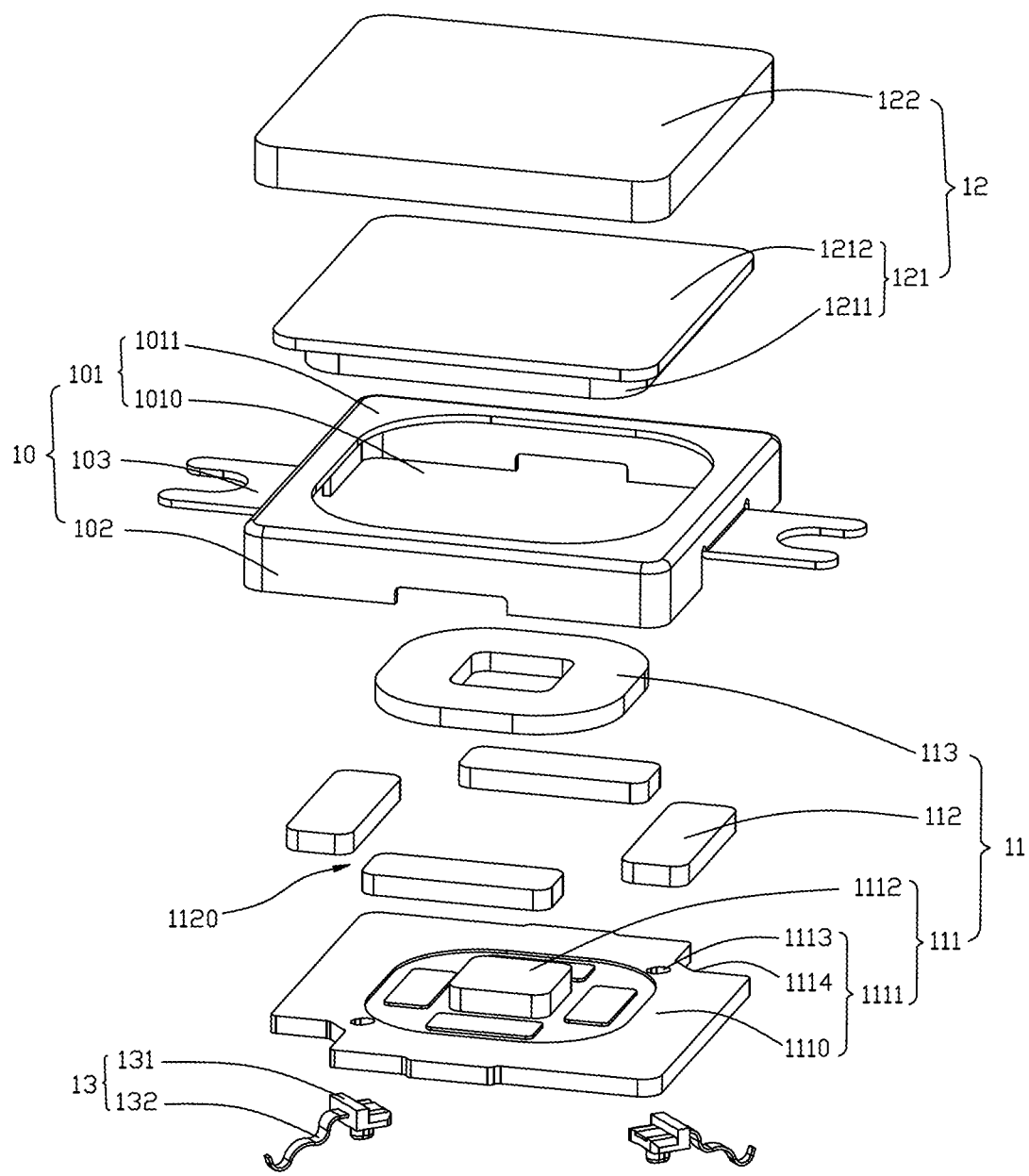
FIG. 1 is an isometric exploded view of a vibration sounder according to the present disclosure.
Figure 2:
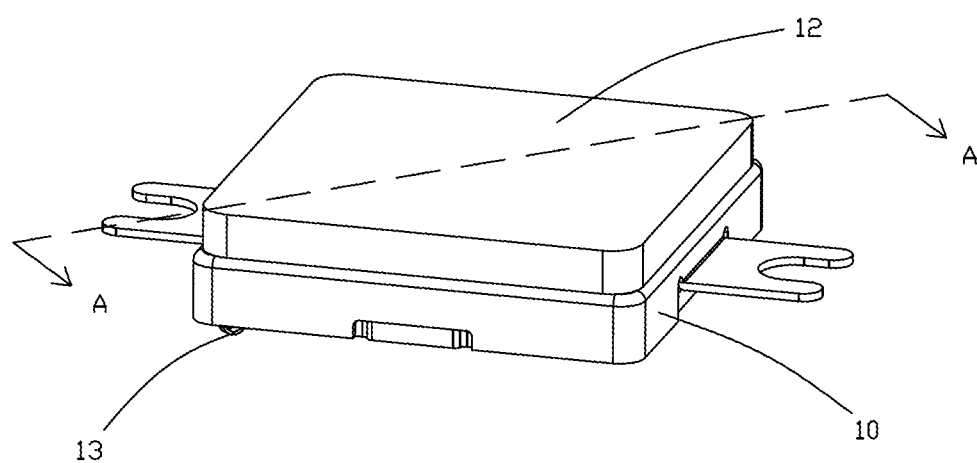
FIG. 2 is an isometric assembly view of the vibration sounder according to the present disclosure.

Referring to FIG. 1 and FIG. 2, FIG. 1 is an isometric exploded view of a vibration sounder according to the present disclosure, and FIG. 2 is an isometric assembly view of the vibration sounder of FIG. 1.

The vibration sounder 1 comprises a hollow enclosure 10, a stator 11, a mover 12 and a pair of conductive terminals 13. The enclosure 10 receives the stator 11 and the mover 12 therein. The mover 12 locates above the stator 11 and stacks thereon. The conductive terminals 13 receive an electric signal from an external source and then transmit the signal to the stator 11 for driving the mover 12 to vibrate.

The enclosure 10 comprises a top wall 101, a sidewall 102 and two extending portions 103. The sidewall 102 is bent and extends from the same side of the top wall 101 and cooperates with the top wall 101 to form a receiving space (not indicated). The extending portions 103 are bent and extend from the sidewall 102 and towards a direction away from the receiving space. The two extending portions 103 are symmetrically disposed on two opposite outer sides of the sidewall 102 of the enclosure 10. The top wall 101 joins with the sidewall 102. The top wall 101 is provided with a first through hole 1010 and a first upper surface 1011 on an outer side surface thereof. The first through hole 1010 is formed in a central area of the first upper surface 1011. The first through hole 1010 extends through the top wall 101 to form a hollow structure and communicates with the receiving space.

The stator 11 comprises a magnetic yoke 111, steel magnets 112 and a coil 113.

The magnetic yoke 111 comprises a body portion 1111, a magnetic core 1112 protruding from the body portion 1111 and second through holes 1113 extending through the body portion 1111. The body portion 1111 is formed with another upper surface 1110, which is located near the mover 12 side. The body portion 1111 is a generally square-shaped structure, which is formed with two notches 1114 at edges of two opposite corners thereof. The notches 1114 are disposed diagonally at corners of the body portion 1111. The second through holes 1113 are formed near the notches 1114.

The number of the steel magnets 112 is four. The steel magnets 112 are disposed on the second upper surface 1110 and are spaced apart from the magnetic core 1112 by a magnetic gap. A clearance 1120 is formed between every two adjacent steel magnets 112.

The coil 113 is received in the magnetic gap 110 and fixed on the magnetic yoke 111.

The mover 12 comprises a vibrating plate 121 partially received in the enclosure 10 and a hollow elastic cushion 122 fixed on the first upper surface 1011 of the enclosure 10. The vibrating plate 121 comprises a vibrating portion 1211 and a supporting portion 1212. The vibrating portion 1211 extends through the first through hole 1010 and is received in the receiving space correspondingly. An outer profile of the vibrating portion 1211 is smaller than the supporting portion 1212. The supporting portion 1212 joins with the vibrating portion 1211. The supporting portion 1212 is received in the hollow portion of the elastic cushion 122 correspondingly.

Figure 3:
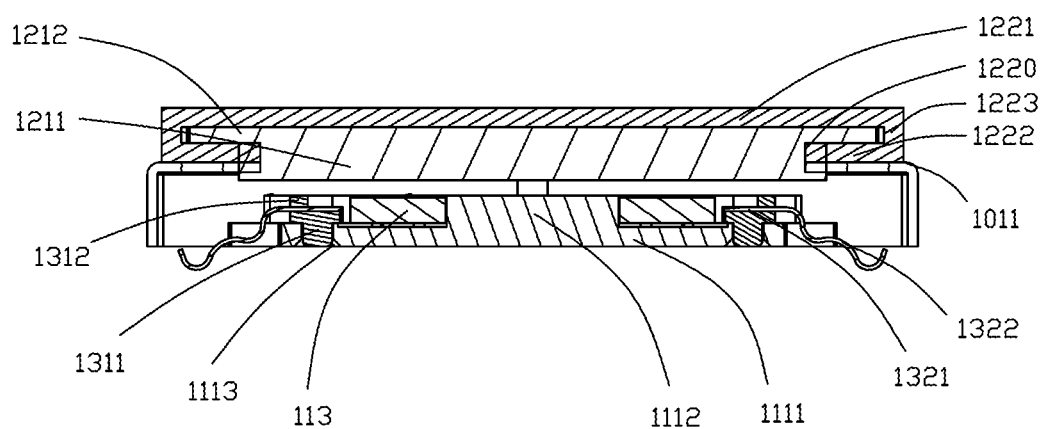
FIG. 3 is a cross-sectional view taken along an A-A line of FIG. 2.

Referring to FIG. 3, it is a cross-sectional view taken along a line A-A of FIG. 2. The elastic cushion 122 comprises a top portion 1221, a bottom portion 1222 that is located below the top portion 1221 and connects with the first upper surface 1011 and side portions 1223 that connect the top portion 1221 with the bottom portion 1222. The bottom portion 1222 is formed with a third through hole 1220 that communicates with the first through hole 1010. The vibrating portion 1211 is received in the third through hole 1220. The top portion 1221 cooperates with the bottom portion 1222 and the side portions 1223 to form the hollow portion of the elastic cushion 122. The supporting portion 1212 is set up on the bottom portion 1222.

Figure 4:
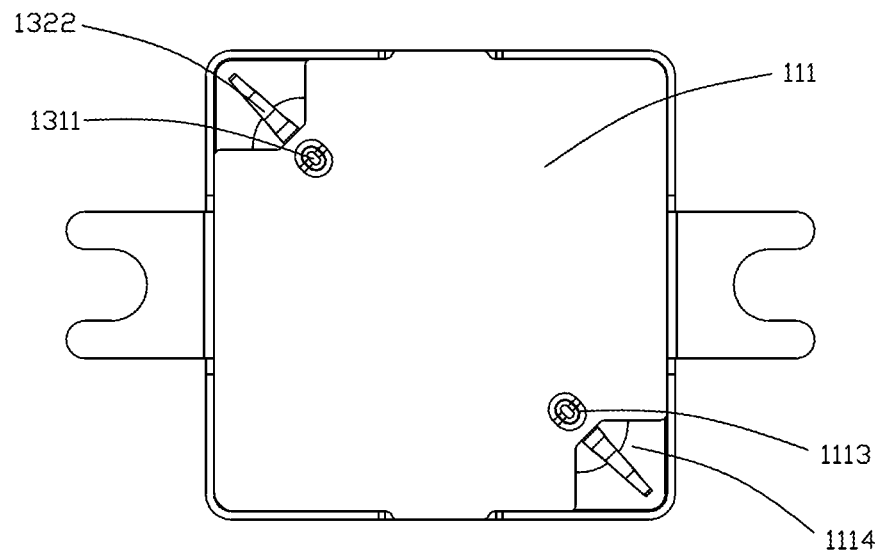
FIG. 4 is a bottom view of the vibration sounder according to the present disclosure.
Figure 5:
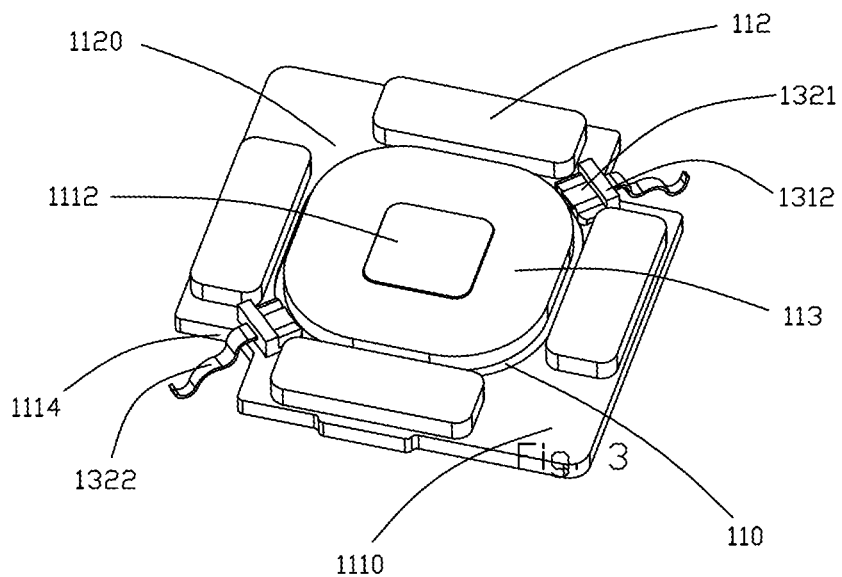
FIG. 5 is an isometric assembly view of a stator combined with conductive terminals of the vibration sounder according to the present disclosure.
Figure 6:
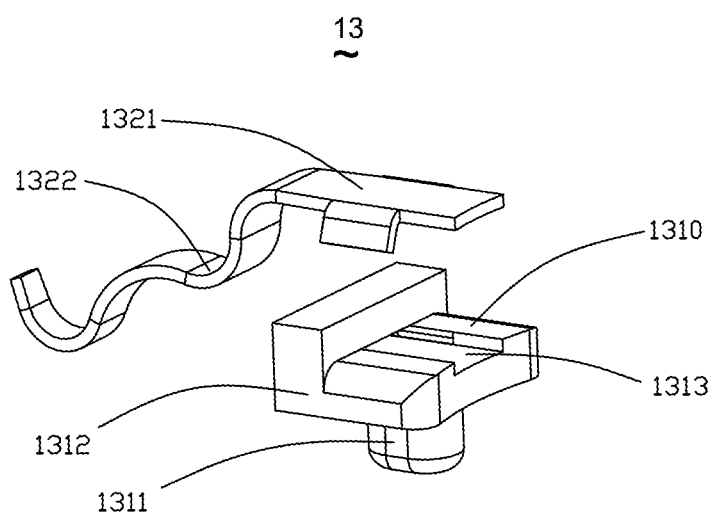
FIG. 6 is an isometric exploded view of the conductive terminal of the vibration sounder according to the present disclosure.

Refer to FIG. 4 to FIG. 6 together. FIG. 4 is a bottom view of the vibration sounder of FIG. 1. FIG. 5 is a perspective assembly view of the stator combined with the conductive terminals of the vibration sounder of FIG. 1. FIG. 6 is a perspective exploded view of the conductive terminals of the vibration sounder of FIG. 1.

Each of the conductive terminals 13 comprises an insulative portion 131 received in the second through hole 1113 and a conductive portion 132 connecting with the insulative portion 131.

The insulative portion 131 comprises a first fixed portion 1311 and a second fixed portion 1312 that joins with each other. The first fixed portion 1311 is fixed in the second through hole 1113. The second fixed portion 1312 is fixed on the first upper surface 1110 of the body portion 1111. The second fixed portions 1312 are interposed in two opposite clearances 1120 of the steel magnets 112 and each have a third upper surface 1310. A groove 1313 is disposed on the third upper surface 1310.

The conductive portion 132 comprises a connecting portion 1321 received in the groove 1313 and an extending portion 1322 that is bent and extends from the connecting portion 1321 towards a direction away from the magnetic core 1112. The extending portion 1322 is partially received in the notch 1114.

When the vibration sounder 1 is energized, the conductive terminals 13 provide an alternating current to the coil 113, so that an alternating magnetic field is generated by the coil 113 and a static magnetic field is generated by the steel magnets 112. Since the vibrating plate 121 is made of iron, it can vibrate under the alternating magnetic field and the static magnetic field.

Since the conductive terminals 13 are fixed on the magnetic yoke 111, the enclosure 10 does not need to be provided with a space for receiving the conductive terminals 13, so that the overall volume of the vibration sounder 1 is reduced while the structure of the enclosure 10 is simplified. In this embodiment, the insulative portion 131 of the conductive terminal 13 is made of plastic and is fixed in the first through hole 1113 of the magnetic yoke 111 with glue. In other embodiments, the insulative portion 131 may also be fixed in other common fixing manners.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration sounder, comprising:
an enclosure having a receiving space,
a stator received in the receiving space, the stator comprising a magnetic yoke formed with a through hole,
a mover located above the stator,
a conductive terminal, comprising an insulative portion received in the through hole and a conductive portion connecting with the insulative portion,
wherein the magnetic yoke comprises a body portion forming a notch for partially receiving the conductive portion, the through hole extends through the body portion and is located near the notch; and wherein
the body portion has an upper surface, the insulative portion comprises a first fixed portion and a second fixed portion, the first fixed portion is fixed in the through hole of the magnetic yoke, and the second fixed portion is fixed on the upper surface of the body portion; and wherein
the magnetic yoke comprises a magnetic core protruding from the body portion, the second fixed portion has another upper surface on which a groove is formed, the conductive portion comprises a connecting portion and an extending portion, the connecting portion is received in the groove, the extending portion is bent and extends towards a direction away from the magnetic core, and the extending portion is received in the notch.

2. The vibration sounder of claim 1, wherein the magnetic yoke further comprises a magnetic core protruding from the body portion, the stator further comprises a steel magnet and a coil, the steel magnet is disposed on the upper surface of the body portion and is spaced apart from the magnetic core by a magnetic gap, and the coil is received in the magnetic gap and fixed on the magnetic yoke.

3. The vibration sounder of claim 2, wherein the stator comprises a plurality of steel magnets, a clearance communicating with the magnetic gap is formed between every two adjacent steel magnets, and the second fixed portion is located in the clearance.

4. The vibration sounder of claim 1, wherein the enclosure comprises a top wall, a sidewall jointing with the top wall for enclosing the receiving space, and an extending portion bent and extending from the sidewall towards a direction away from the receiving space, an upper surface of the top wall being formed with a through hole extending through the top wall.

5. The vibration sounder of claim 4, wherein the mover comprises a vibrating plate partially received in the enclosure and an elastic cushion, and the vibrating plate comprises a vibrating portion received in the through hole of the top wall and a supporting portion received in the elastic cushion.

6. The vibration sounder of claim 5, wherein the elastic cushion comprises a top portion, a bottom portion and side portions connecting the top portion with the bottom portion for forming a hollow structure, the bottom portion is formed with a through hole, the vibrating portion is received in the through hole of the bottom portion of the elastic cushion, and the supporting portion is disposed on the bottom portion.

7. A vibration sounder, comprising:
an enclosure having a receiving space,
a stator received in the receiving space, the stator comprising a magnetic yoke, the magnetic yoke being formed with through holes, and notches disposed diagonally at corners of the magnetic yoke and near the through holes,
a mover located above the stator,
two conductive terminals, each comprising an insulative portion and a conductive portion connecting with each other, the insulative portions being received in the through holes and the conductive portions being disposed diagonally at the notches, wherein the magnetic yoke comprises a body portion forming a notch for partially receiving the conductive portion, the through hole extends through the body portion and is located near the notch; and wherein the body portion has an upper surface, the insulative portion comprises a first fixed portion and a second fixed portion, the first fixed portion is fixed in the through hole of the magnetic yoke, and the second fixed portion is fixed on the upper surface of the body portion; and wherein the magnetic yoke comprises a magnetic core protruding from the body portion, the second fixed portion has another upper surface on which a groove is formed, the conductive portion comprises a connecting portion and an extending portion, the connecting portion is received in the groove, the extending portion is bent and extends towards a direction away from the magnetic core, and the extending portion is received in the notch.

8. The vibration sounder of claim 7, wherein the magnetic yoke comprises a body portion for forming the through hole which extends through the body portion, the insulative portion of the conductive terminal comprise a first fixed portion engaging with the through hole and a second fixed portion fixed to an upper surface of the body portion.

9. The vibration sounder of claim 8, wherein an upper surface of the magnetic yoke is formed with a groove, the conductive portion comprises a connecting portion received in the groove and a extending portion partially received in the notch.

* * * * *